United States Patent [19]
Hendi et al.

[11] Patent Number: 6,036,766
[45] Date of Patent: *Mar. 14, 2000

[54] MIXED CRYSTALS AND SOLID SOLUTIONS OF 1,4-DIKETOPYRROLOPYRROLES

[75] Inventors: Shivakumar Basalingappa Hendi, Newark; Fridolin Bäbler, Hockessin, both of Del.; Zhimin Hao, Marly; Abul Iqbal, Arconciel, both of Switzerland

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,488

[22] Filed: Feb. 27, 1997

Related U.S. Application Data

[60] Provisional application No. 60/012,938, Mar. 6, 1996.
[51] Int. Cl.⁷ ........................ C08K 5/3415; C09B 48/00; C09B 67/22
[52] U.S. Cl. ........................ 106/494; 106/495; 106/497; 106/498; 548/453
[58] Field of Search ................ 548/453; 106/494, 106/495, 497, 498

[56] References Cited

U.S. PATENT DOCUMENTS

| | | | |
|---|---|---|---|
| 4,579,949 | 4/1986 | Rochat et al. | 546/167 |
| 4,720,305 | 1/1988 | Iqbal et al. | 106/288 |
| 4,810,304 | 3/1989 | Jaffe et al. | 106/494 |
| 5,529,623 | 6/1996 | Hendi et al. | 106/495 |
| 5,565,578 | 10/1996 | Bäbler | 548/453 |
| 5,756,746 | 5/1998 | Hao et al. | 546/56 |

*Primary Examiner*—Laura L. Stockton
*Attorney, Agent, or Firm*—Kevin T. Mansfield; David R. Crichton

[57] ABSTRACT

Ternary solid solutions useful as pigments are disclosed. The ternary solid solutions result from incorporating a third component, which is a diketopyrrolopyrrole or quinacridone pigment, into the crystal lattice of the mixed crystal formed from equimolar amounts of two different diketopyrrolopyrrole pigments.

21 Claims, No Drawings

MIXED CRYSTALS AND SOLID SOLUTIONS OF 1,4-DIKETOPYRROLOPYRROLES

This application claims the benefit of Provisional Application No. 60/012,938, filed Mar. 6, 1996.

The present invention relates to novel single-phase mixed crystals, also known as solid compounds, and solid solutions of two different symmetrical 1,4-diketopyrrolopyrroles and to the use thereof as pigments. The present invention further relates to single-phase ternary solid solutions which contain at least two different symmetrical 1,4-diketopyrrolopyrroles and a third component which is a quinacridone or a third 1,4-diketopyrrolopyrrole.

1,4-Diketopyrrolopyrroles, including symmetrical and asymmetrical 1,4-diketopyrrolopyrroles, i.e. of the

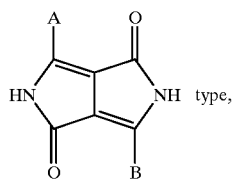
type, wherein A and B are aryl groups, their preparation and the use thereof as pigments are disclosed, inter alia, in U.S. Pat. No. 4,579,949. U.S. Pat. No. 4,778,899 discloses a process for the preparation of pure asymmetrical 1,4-diketopyrrolopyrroles. This process consists of an elaborate synthesis which is carried out via the stage of special amino esters or pyrrolinones.

U.S. Pat. No. 4,783,540 furthermore discloses that solid solutions can be obtained by mixing two different 1,4-diketopyrrolopyrroles, preferably in the ratio of 65–90:10–35% by weight, and carrying out subsequent treatment such as kneading, grinding or precipitating. Solid solutions containing a diketopyrrolopyrrol-type pigment and a pigment of another class, for example, a quinacridone or quinacridonequinone, are described in U.S. Pat. No. 4,810,304. The disclosed solid solutions are characterized by their X-ray diffraction patterns, the X-ray diffraction patterns of the solid solutions being different from the sum of the X-ray diffraction patterns of the single components.

It has now been found that mixtures of two different symmetrical 1,4-diketopyrrolopyrroles of formulae

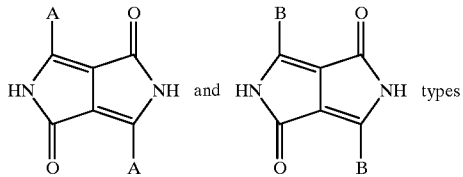

in a molar ratio of 1:1, form novel mixed crystals which, very surprisingly, are isomorphous with the crystals of the corresponding asymmetrical 1,4-diketopyrrolopyrroles of the

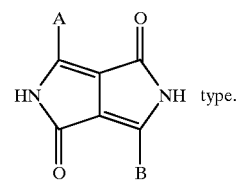
type.

These products are single-phase products whose X-ray diffraction pattern differs from that of the single components of the mixed crystal and also from that of their physical mixture. The X-ray diffraction pattern of the mixed crystal and that of the asymmetrical single component is, however, virtually identical.

Accordingly, the invention relates to mixed crystals of 1,4-diketopyrrolo[3,4-c]pyrroles, consisting of two different compounds of formulae

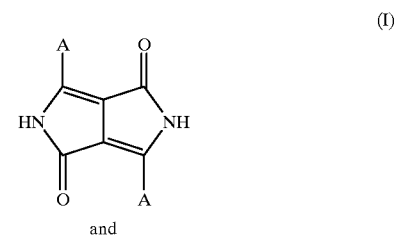

and

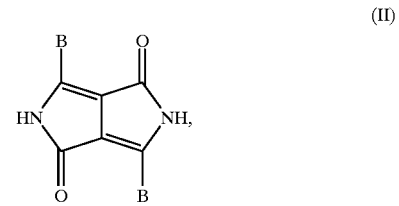

in a molar ratio of 1:1, wherein A and B, which must be different, are each a group of formula

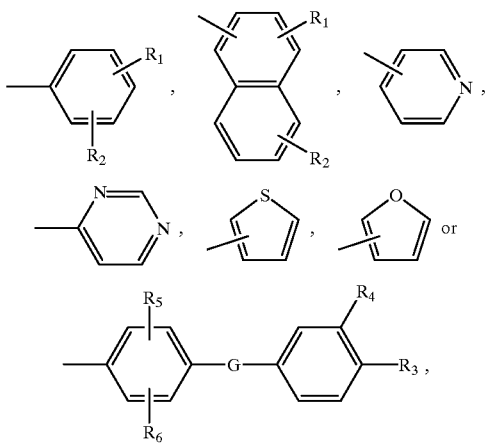

wherein $R_1$ and $R_2$ are each independently of the other hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_1$–$C_{18}$alkoxycarbonyl, C$_1$–C$_{18}$alkylaminocarbonyl, —CN, —NO$_2$, trifluoromethyl, C$_5$–C$_6$cycloalkyl, —C=N—(C$_1$–C$_{18}$alkyl), phenyl,

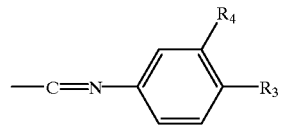

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH$_2$—, —CH(CH$_3$)—, —C(CH$_3$)$_2$—, CH=N—, —O—, —S—, —SO—, —SO$_2$—, —CONH— or —NR$_7$—, R$_3$ and R$_4$ are each independently of the other hydrogen, halogen, C$_1$–C$_6$alkyl, C$_1$–C$_{18}$alkoxy or —CN, R$_5$ and R$_6$ are each independently of the other hydrogen, halogen or C$_1$–C$_6$alkyl, and R$_7$ is hydrogen or C$_1$–C$_6$alkyl, with the proviso that, if one of the radicals A and B is phenyl, then the other cannot be p-chlorophenyl.

Substitutents defined as halogen are typically iodo, fluoro, preferably bromo and, most preferably, chloro;

C$_1$–C$_6$alkyl is typically methyl, ethyl, n-propyl, isopropyl, n-butyl, sec-butyl, tert-butyl, n-amyl, tert-amyl, hexyl, and C$_1$–C$_{18}$alkyl is in addition typically heptyl, octyl, 2-ethylhexyl, nonyl, decyl, dodecyl, tetradecyl, hexadecyl or octadecyl.

C$_1$–C$_{18}$Alkoxy is, also in C$_1$–C$_{18}$alkoxycarbonyl, typically methoxy, ethoxy, n-propoxy, isopropoxy, butoxy, hexyloxy, decyloxy, dodecyloxy, hexadecyloxy or octadecyloxy.

C$_1$–C$_{18}$Alkylmercapto is, for example, methylmercapto, ethylmercapto, propylmercapto, butylmercapto, octylmercapto, decylmercapto, hexadecylmercapto or octadecylmercapto.

C$_1$–C$_{18}$Alkylamino is, also in C$_1$–C$_{18}$alkylaminocarbonyl, typically methylamino, ethylamino, propylamino, hexylamino, decylamino, hexadecylamino or octadecylamino.

C$_5$–C$_6$Cycloalkyl is typically cyclopentyl and, preferably, cyclohexyl.

Of particular interest are those novel mixed crystals wherein A and B in formulae I and II are each a group of formula

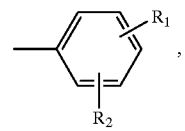

wherein R$_1$ and R$_2$ are each independently of the other hydrogen, chloro, bromo,
C$_1$–C$_4$alkyl, C$_1$–C$_6$alkoxy, C$_1$–C$_6$alkylamino, phenyl or CN,
G is —O—, —NR$_7$—, —N=N— or —SO$_2$—, R$_3$ and R$_4$ are hydrogen, and R$_7$ is hydrogen, methyl or ethyl, and more particularly those mixed crystals wherein A and B in formulae I and II are each a group of formula wherein R$_1$ and R$_2$ are each independently of the other hydrogen, methyl, tert-butyl, chloro, bromo or CN. At least one of R$_1$ and R$_2$ is preferably hydrogen.

The novel mixed crystals may be prepared starting from physical mixtures of the above defined components of formulae I and II in general accordance with the following per se known processes:

by contacting in polar organic solvents, preferably by stirring the component mixture at reflux temperature, by alkaline precipitation of the component mixture from polar organic solvents, such as DMSO, or by stirring the component mixture in polar organic solvents in the presence of alkali metal alcoholates, alkali metal hydroxides or quaternary ammonium compounds, or by acid precipitation, for example, by dissolving the component mixture in acid and precipitating the solid solution by dilution with water, by grinding methods, for example, by grinding the component mixture in a ball mill in the presence of grinding media, separating the component mixture from the grinding media, and subsequently subjecting the powder to a crystal growth step, for example, by stirring the component mixture in dilute acid, such as 2% sulfuric acid.

by preparing a premilled powder of the component mixture and subsequently subjecting the premilled powder to a ripening step using an organic solvent or an aqueous media, preferably in the presence of a surfactant.

which processes may be carried out in general accordance with the processes disclosed in detail, inter alia, in U.S. Pat. No. 4,783,540.

A novel method of preparation is that wherein the compounds of formulae I and II, including also those wherein A and B are each independently of the other phenyl and p-chlorophenyl, are reacted by per se known methods with a dicarbonate of formula

D—O—D (III), or with a trihaloacetate of formula

(R$_8$)$_3$C—D (IV), or with an azide of formula

DN$_3$ (V), or with a carbonate of formula

D—OR$_9$ (VI), or with an alkylidene-iminooxyformate of formula

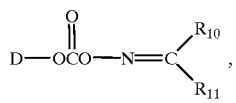
(VII)

wherein D is a group of formula

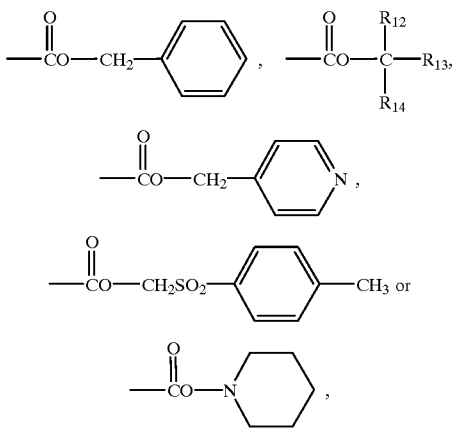

$R_8$ is chloro, fluoro or bromo, $R_9$ is $C_1$–$C_4$alkyl or phenyl which is unsubstituted or substituted by halogen, $C_1$–$C_4$ alkyl, $C_1$–$C_4$alkoxy or —CN, $R_{10}$ is —CN or —COOR$_9$, and $R_{11}$ is phenyl which is unsubstituted or substituted by halogen, $C_1$–$C_4$alkyl, $C_1$–$C_4$alkoxy or —CN, $R_{12}$, $R_{13}$ and $R_{14}$ are each independently of one another hydrogen, $C_1$–$C_6$alkyl or $C_2$–$C_5$alkenyl, and at least two of $R_{12}$, $R_{13}$ and $R_{14}$ must be alkyl or alkenyl, in the molar ratio of 1:2 in an aprotic organic solvent in the presence of a base as catalyst, to soluble compounds of formulae

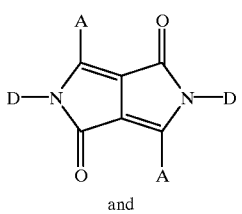
(VIII)

and

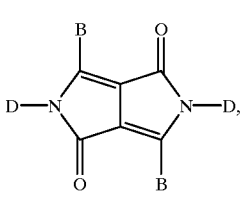
(IX)

and these compounds are either
a) mixed homogeneously in powdered form by generally known methods in the molar ratio of 1:1, or
b) mixed homogeneously in powdered form by generally known methods in the molar ratio of 1:1 and the mixture is dissolved in a solvent, or
c) first dissolved and then mixed in solution in the mixture ratio of 1:1, and subsequently the desired mixed crystal is precipitated from the dry or dissolved mixture by thermal, photolytic or chemical treatment.

$R_{12}$, $R_{13}$ and $R_{14}$ defined as $C_2$–$C_5$alkenyl are typically vinyl, allyl, methalyl, n-but-2-enyl, 2-methyl-prop-2-enyl or n-pent-2-enyl.

$R_{12}$ and $R_{14}$ are preferably methyl, and $R_{13}$ is $C_1$–$C_6$alkyl and, preferably, methyl.

D is preferably a group of formula

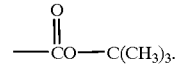

The compounds of formulae I and II are preferably reacted with a dicarbonate of formula III.

The dicarbonates, of formula III, the trihaloacetates of formula IV, the azides of formula V, the carbonates of formula VI and the alkylidene-iminooxyformnates of formula VII are known substances. However, any that are novel may be prepared in general accordance with known methods.

Suitable aprotic organic solvents are typically ethers, such as tetrahydrofuran or dioxane, or glycol ethers such as ethylene glycol methyl ether, ethylene glycol ethyl ether, diethylene glycol monomethyl ether or diethylene glycol monoethyl ether, and also dipolar aprotic solvents, typically acetonitrile, benzonitrile, N,N-dimethylformamide, N,N-dimethylacetamide, nitrobenzene, N-methylpyrrolidone, halogenated aliphatic or aromatic hydrocarbons, e.g. trichloroethane, benzene or alkyl-, alkoxy- or halogen-substituted benzene, such as toluene, xylene, anisol or chlorobenzene, or aromatic N-heterocycles, such as pyridine, picoline or quinoline. Preferred solvents are typically tetrahydrofuran, N,N-dimethylformamide, N-methylpyrrolidone. The indicated solvents may also be used as mixtures. It is expedient to use 5–20 parts by weight of solvent per 1 part by weight of the reactants.

Bases suitable for use as catalysts are typically the alkali metals themselves, such as lithium, sodium or potassium as well as the hydroxides and carbonates thereof, or alkali metal amides, such as lithium amide, sodium amide or potassium amide, or alkali metal hydrides, such as lithium hydride, sodium hydride or potassium hydride, or alkaline earth metal alcoholates or alkali metal alcoholates, which are derived in particular from primary, secondary or tertiary aliphatic alcohols containing 1 to 10 carbon atoms, typically lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic, aromatic or heterocyclic N-bases, including e.g. diazabicyclooctene, diazabicycloundecene and 4-dimethylamino-pyridine, trialkylamines such as trimethylamine or triethylamine. A mixture of these bases may also be used.

The organic N-bases are preferred, typically diazabicyclooctene, diazabicycloundecene and, preferably, 4-dimethylaminopyridine.

The reaction is conveniently carried out in the temperature range from 10 to 100° C, preferably from 14 to 40° C., and under atmospheric pressure.

If the mixed crystals are prepared by a method wherein the components are dissolved in a solvent, the compounds of formula I or II are either mixed in powdered form in the desired ratio by standard known methods and the mixture is then dissolved in the solvent, or they are first dissolved in the solvent individually and the solutions are then mixed in the desired ratio.

The following solvents may be conveniently used: ethers such as tetrahydrofuran or dioxane, or glycol ethers such as ethylene glycol methyl ether, ethylene glycol ethyl ether, diethylene glycol monomethyl ether or diethylene glycol monoethyl ether, polyalcohols such as polyethylene glycol, ketones such as acetone, ethyl methyl ketone, isobutyl methyl ketone or cyclohexanone; and also dipolar aprotic solvents, typically including acetonitlile, benzonitrile, N,N-dimethylformamide, N,N-dimethylacetamide, nitrobenzene, N-methylpyrrolidone, dimethyl sulfoxide, halogenated aliphatic or aromatic hydrocarbons, such as trichloroethane, dichloromethane, chloroform, benzene or alkyl-, alkoxy- or halogen-substituted benzene, typically toluene, xylene, anisol or chlorobenzene, aromatic N-heterocycles, such as pyridine, picoline or quinoline or high-boiling solvents e.g. decaline, n-dodecane or kerosene, or mixtures thereof. Preferred solvents are typically toluene, diphenyl ether, N-methylpyrrolidone, N,N-dimethylformamide, dimethyl sulfoxide and quinoline.

The concentration of the compounds of formula I or II in the solvent or solvent system may vary greatly, depending on the solvent. It is convenient to use 0.1 to 20% by weight, preferably 0.2 to 5% by weight, of the compound of formula I or II, based on the entire solution.

The mixed crystals consisting of the compounds of formulae I and II may be obtained in simplest possible manner from the dry or dissolved mixture, either by subjecting the dry or dissolved mixture of the compounds of formulae VIII and IX a) to a thermal treatment, i.e. by heating to the temperature range from 50 to 400° C., preferably from 100 to 200° C., or by laser irradiation, b) to a photolytic treatment, i.e. by irradiation with wave lengths below 375 nm, or c) to a chemical treatment, i.e. with an organic or inorganic acid, such as acetic, toluenesulfonic, trifluoroacetic, hydrochloric or sulfuric acid, and by isolating the product so obtained by conventional methods.

As already mentioned, the X-ray diffraction pattern of the novel mixed crystals is characterized by lines differing from those of the X-ray diffraction patterns of the corresponding physical mixture and the corresponding single components, but, in general, the x-ray diffraction pattern is essentially the same as that of the corresponding asymmetrical diketopyrrolopyrrole of the

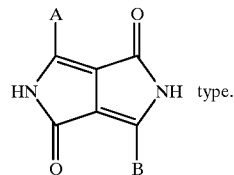 type.

Surprisingly, however, it has also been found that, contrary to the expectation that the larger component will form the crystal lattice (host lattice) wherein the smaller component lodges as guest when a minor excess of the 1,4-diketopyrrolopyrrole having the smaller geometrical constitution is used, it is the 1:1 molar mixed crystal described above which forms first and in whose lattice the excess is lodged to form a solid solution. Accordingly, the single-phase solid solution so obtained has the same crystal lattice as the 1:1 molar mixed crystal, and the corresponding X-ray diffraction patterns are virtually identical.

Diketopyrrolopyrroles of smaller geometrical constitution will be understood as meaning compounds having smaller molecular dimensions (less steric hindrance) i.e. requiring less space. Based on the meanings of A and B:

| unsubstituted phenyl | < substituted phenyl; |
| p-methylphenyl | < p-tert-butylphenyl; |
| cyanophenyl | < chlorophenyl; etc. |

The formation of such solid solutions makes it possible to achieve very interesting and useful changes in shade without affecting the good pigment properties.

Accordingly, the invention also relates to single-phase solid solutions of 1,4-diketopyrrolo[3,4-c]pyrroles, consisting of two different compounds of formulae

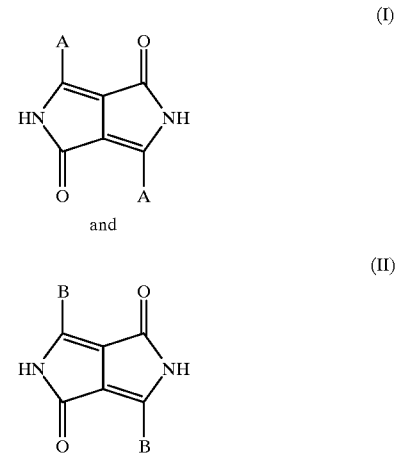

having the meaning indicated above, with the proviso that the 1,4-diketopyrrolo[3,4-c]pyrrole having the smaller geometrical constitution is contained therein in an amount of 50 to 70 mol %, preferably 55 to 60 mol %.

Substituents A and B here also have the preferred meanings indicated above for the 1:1 molar mixed crystals.

It has further been found that by adding a quinacridone or of a further 1,4-diketopyrrolo[3,4-c]pyrrole to the equimolar mixture of the two 1,4-diketopyrrolo[3,4-c]pyrroles of formulae I and II, very surprisingly the equimolar mixed crystal described above forms and the quinacridone or the 1,4-diketopyrrolo[3,4-c]pyrrole is incorporated into the crystal lattice to form a ternary single-phase solid solution. Accordingly the single-phase ternary solid solution thus obtained has the same crystal lattice as the equimolar mixed crystal, and the corresponding X-ray diffraction patterns are essentially the same. This again makes it possible to obtain very interesting and unexpected changes in shade without affecting the good pigment properties.

Accordingly, the invention further relates to single-phase ternary solid solutions consisting of two different compounds of formulae

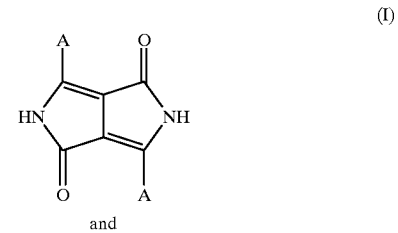

-continued

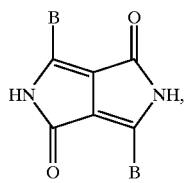
(II)

wherein A and B, which must be different, are each a group of formula

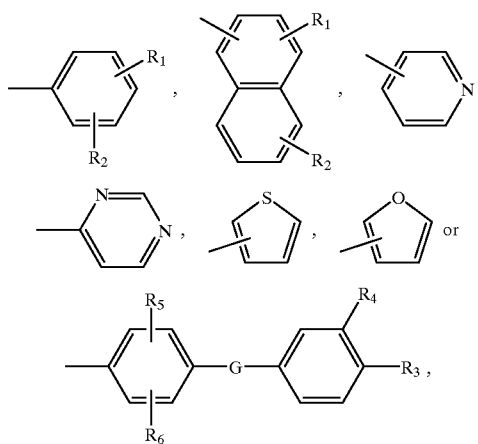

wherein

R₁ and R₂ are each independently of the other hydrogen, halogen, $C_1-C_{18}$alkyl,
$C_1-C_{18}$alkoxy, $C_1-C_{18}$alkylmercapto, $C_1-C_{18}$alkylamino, $C_1-C_{18}$alkoxycarbonyl,
$C_1-C_{18}$alkylaminocarbonyl, —CN, —CONH₂, —NO₂, trifluoromethyl, $C_5-C_6$cycloalkyl,
phenyl, —C=N—($C_1-C_{18}$alkyl),

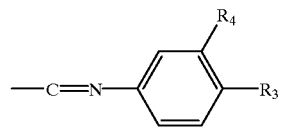

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH₂—, —CH(CH₃)—, —C(CH₃)₂—, —CH=N—, —N=N—, —O—, —S—, —SO—, —SO₂—, —CONH— or —NR₇—, R₃ and R₄ are each independently of the other hydrogen, halogen, $C_1-C_6$alkyl, $C_1-C_{18}$alkoxy or —CN, R₅ and R₆ are each independently of the other hydrogen, halogen or $C_1-C_6$alkyl, and R₇ is hydrogen or $C_1-C_6$alkyl, and a third component which is a quinacridone of formula

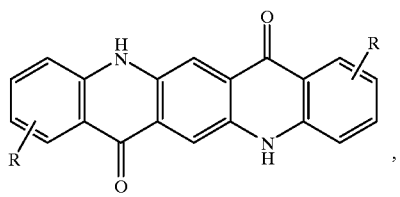
(XII)

wherein R is hydrogen, halogen, $C_1-C_6$alkyl or $C_1-C_6$alkoxy, or which third component is a 1,4-diketopyrrolo[3,4-c]pyrrole different from I and II of the formula

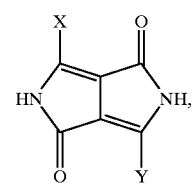
(XIII)

wherein X and Y are each independently of the other a group of formula

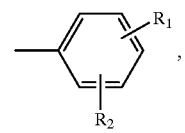

with R₁ and R₂ having the same meaning given above; wherein the ternary solid solution has an x-ray diffraction pattern that is essentially the same as the x-ray diffraction pattern exhibited by a mixed crystal composed of an equimolar amount of (I) and (II); with the proviso that the third component is not a disubstituted quinacridone when components (I) and (II) are 1,4-diketo-3,6-diphenylpyrrolo[3,4-c]pyrrole and 1,4-diketo-3,6-di(4-chlorophenyl)pyrrolo[3,4-c]pyrrole.

The diketopyrrolopyrrole compounds are designated (I) and (II) for convenience. Of course, these are completely interchangeable with each other in the above formula.

A disubstituted quinacridone is a compound of formula (XII) wherein both R substituents are other than hydrogen.

The expression "essentially the same as" is intended to mean that there is sufficient overlap in the x-ray diffraction patterns to support the conclusion that the third component is incorporated into the crystal lattice of the mixed crystal of (I) and (II). In accord with this definition, it is possible for x-ray diffraction patterns which are essentially the same to have peaks in slightly different relative positions and/or for the x-ray diffraction patterns to be missing one or more minor peaks or to have additional minor peaks. Generally, minor peaks are those which have a relative intensity of less than 20 percent of the largest peak.

Of particular interest are ternary solid solutions wherein A and B in formulae I and II are each a group of formula

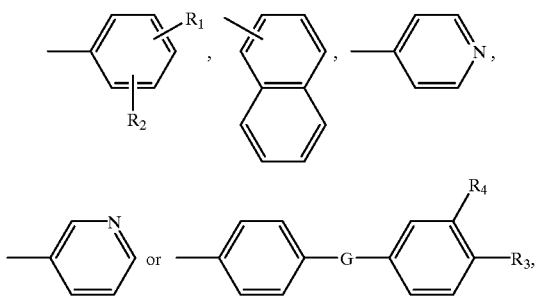

wherein $R_1$ and $R_2$ are each independently of the other hydrogen, chloro, bromo, $C_1$–$C_4$alkyl, $C_1$–$C_6$alkoxy, $C_1$–$C_6$alkylamino, phenyl or CN, G is —O—, —$NR_7$—, —N=N— or —$SO_2$—, $R_3$ and $R_4$ are hydrogen, and $R_7$ is hydrogen, methyl or ethyl, and more particularly those ternary solid solutions wherein A and B in formulae I and II are each a group of formula

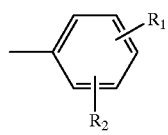

wherein $R_1$ and $R_2$ are each independently of the other hydrogen, methyl, tert-butyl, chloro, bromo, phenyl or CN.

One of $R_1$ and $R_2$ is preferably hydrogen.

The 2,9 and 4,11 disubstituted quinacridones embraced by formula XII are especially suitable as quinacridone third components.

Preferred quinacridones of formula XII are those wherein R is hydrogen, chloro, $C_1$–$C_3$alkyl, methoxy or ethoxy, especially those wherein R is hydrogen, chloro or methyl.

Preferred 1,4-diketopyrrolo[3,4-c]pyrroles of formula XIII are those wherein $R_1$ and $R_2$ are each independently of the other hydrogen, chloro, bromo, $C_1$–$C_4$alkyl, $C_1$–$C_6$alkoxy, $C_1$–$C_6$alkylamino or CN, and especially those, wherein X and Y are identical groups and $R_1$ and $R_2$ are each independently of the other hydrogen, methyl, tert-butyl, chloro, bromo, phenyl or CN, one of $R_1$ and $R_2$ preferably being hydrogen. Especially preferred 1,4-diketopyrrolo[3,4-c]pyrroles of formula XIII are those wherein one of $R_1$ and $R_2$ is hydrogen and the other is in the para-position.

Especially useful ternary solid solutions are those wherein (I) and (II) are selected from the group consisting of 1,4-diketo-3,6-diphenylpyrrolo[3,4-c]pyrrole (unsubstituted DPP), 1,4-diketo-3,6-di(4-chlorophenyl)pyrrolo[3,4-c] pyrrole (dichloro DPP) and 1,4-diketo-3,6-di(4-tert-butylphenyl)pyrrolo[3,4-c]pyrrole (di(t-butylphenyl) DPP). Examples of such ternary solid solutions include those wherein (I) is 1,4-diketo-3,6-diphenylpyrrolo[3,4-c]pyrrole and (II) is 1,4-diketo-3,6-di(4-chlorophenyl)-pyrrolo[3,4-c] pyrrole, those wherein (I) is 1,4-diketo-3,6-diphenylpyrrolo [3,4-c]pyrrole and (II) is 1,4-diketo-3,6-di(4-tert-butylphenyl)pyrrolo[3,4-c]pyrrole or those wherein (I) is 1,4-diketo-3,6-di(4-chlorophenyl)pyrrolo[3,4-c]pyrrole and (II) is 1,4-diketo-3,6-di(4-tert-butylphenyl)pyrrolo[3,4-c] pyrrole. Such ternary solid solutions generally have color characteristics that are similar to, yet darker and more intense than, commercial perylene pigments.

As a quinacridone third component, 2,9-dichloroquinacridone and 2,9-dimethylquinacridone are especially useful.

Of particular interest are ternary solid solutions containing halogen-free DPPs as components (I) and (II) and 2,9-dimethylquinacridone as the third component. Such pigments provide an environmentally sound pigment which is free of chlorine. Such ternary solid solutions are obtained in a highly transparent attractive color by percipitation of the corresponding pigment mixture from basic DMSO.

Useful ternary solid solutions include those wherein (I) is 1,4-diketo-3,6-di(4-chlorophenyl)pyrrolo[3,4-c]pyrrole, (II) is 1,4-diketo-3,6-di(4-tert-butylphenyl)-pyrrolo[3,4-c] pyrrole and the third component is 1,4-diketo-3,6-diphenylpyrrolo-[3,4-c]pyrrole or 2,9-dichloroquinacridone. When the third component is 1,4-diketo-3,6-diphenylpyrrolo[3,4-c]pyrrole such ternary solid solutions are characterized by an x-ray diffraction pattern which exhibits peaks at 4.6±0.2° 2θ, 18.0±0.2° 2θ, and 26.7±0.2° 2θ. When the third component is 2,9-dichloroquinacridone, such ternary solid solutions are characterized by an x-ray diffraction pattern which exhibits peaks at 4.6±0.2° 2θ, 17.9±0.2° 2θ, and 26.5±0.2° 2θ. In each instance, the x-ray diffraction pattern of the ternary solid solution is essentially the same as that of the binary mixed crystal containing an equimolar mixture of 1,4-diketo-3,6-di(4-chlorophenyl) pyrrolo[3,4-c]pyrrole and 1,4-diketo-3,6-di(4-tert-butylphenyl)pyrrolo[3,4-c]pyrrole. However, such ternary solid solutions are significantly bluer than the binary mixed crystal and extremely dark in masstone rubout. Generally, such ternary solid solutions are in the same color space as the commercial perylene pigments.

An especially useful ternary solid solution of the type described in the preceding paragraph consists of about 20 parts by weight of the 1,4-diketo-3,6-diphenylpyrrolo-[3,4-c]pyrrole, about 38 parts by weight of 1,4-diketo-3,6-di(4-chlorophenyl)-pyrrolo[3,4-c]pyrrole about 42 parts by weight of 1,4-diketo-3,6-di(4-tert-butylphenyl)pyrrole[3,4-c]pyrrole.

Other useful ternary solid solutions include those wherein (I) is 1,4-diketo-3,6-diphenyl-pyrrolo[3,4-c]pyrrole and (II) is 1,4-diketo-3,6-di(4-tert-butylphenyl)pyrrolo[3,4-c] pyrrole the third component is 2,9-dichloroquinacridone or 2,9-dimethylquinacridone. Such ternary solid solutions are characterized by an x-ray diffraction pattern which exhibits peaks at 4.7±0.2° 2θ, 18.0±0.2° 2θ, and 26.7±0.2° 2θ. Thus, the x-ray diffraction is essentially the same as that of the binary mixed crystal containing equimolar amounts of (I) and (II).

The ternary solid solution containing unsubstituted DPP as component (I) and di(t-butylphenyl) DPP as component (II) and 2,9-dimethylquinacridone as the third component is especially interesting.

Useful ternary solid solutions also include those wherein (I) is 1,4-diketo-3,6-diphenyl-pyrrolo[3,4-c]pyrrole and (II) is 1,4-diketo-3,6-di(4-tert-butylphenyl)pyrrolo[3,4-c] pyrrole and the third component is 1,4-diketo-3,6-di(4-chlorophenyl)pyrrolo[3,4-c]pyrrole. Such ternary solid solutions are characterized by an x-ray diffraction pattern which exhibits peaks at 4.7±0.2° 2θ, 18.0±0.2° 2θ, and 26.6±0.2° 2θ, which is essentially the same as that of the binary mixed crystal containing equimolar amounts of (I) and (II).

Preferably, the ternary solid solutions of the present invention comprise equimolar quantities of components (I) and (II) and less than 30 mole-percent of the third component, for example from 4 to 28 mole-percent of the third component. In a specific embodiment, the ternary solid solutions of the present invention comprise from 4 to 20 mole-percent of the third component. Many useful ternary solid solutions of the present invention comprise from 15 to 25 mole-percent of the third component. For purposes of this application, solid solutions containing equimolar quantities of components (I) and (II) include ternary solid solutions wherein the molar ratio of (I) and (II) is from 0.95 to 1.05, preferably from 0.98 to 1.02.

The present invention also relates to pigment compositions which comprise one or more of the above-described ternary solid solutions; in particular those pigment compositions which comprise a ternary solid solution described above together with an excess of the third component.

The novel ternary solid solutions are for the most part prepared by the same methods as those used for obtaining the novel 1:1 molar mixed crystals, except for the required amount of the needed components.

If required, recrystallization or thermal treatment is carried out by conventional methods for pigments. The usual method is that of thermal aftertreatment in water, dilute acid or in an organic solvent and, if required, under pressure. It is preferred to use organic solvents, typically benzenes which are substituted by halogen atoms, alkyl groups or nitro groups, such as xylenes, chlorobenzene, o-dichlorobenzene or nitrobenzene, as well as pyridine bases, typically pyridine, picoline or quinoline, and also ketones such as cyclohexanone, alcohols such as isopropanol, butanols or pentanols, ethers such as ethylene glycol mono-methyl ether or ethylene glycol monoethyl ether, amides such as dimethyl formamide or 1-methyl-2-pyrrolidinone, as well as dimethyl sulfoxide or sulfolane. The aftertreatment may also be carried out in water, under normal or elevated pressure, in the presence of organic solvents and/or with the addition of surfactants.

The ternary solid solutions are advantageously prepared by precipitation from basic DMSO.

The novel mixed crystals as well as the novel ternary solid solutions and pigment compositions are useful as pigments for colouring organic material of high molecular weight.

Illustrative examples of high molecular weight organic materials which can be coloured with the novel mixed crystals, ternary solid solutions and pigment compositions are cellulose ethers and esters, typically ethyl cellulose, nitro cellulose, acetate, cellulose butyrate, natural resins or synthetic resins, typically polymerization or condensation resins, such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyester, ABS, polyphenylenoxides, rubber, casein, silicone and silicone resins, singly or in mixtures.

The above high molecular weight organic compounds are obtained singly or as mixtures as plastics, melts or in the form of spinning solutions, paints, coating materials or printing inks. Depending on the end use requirement, it is expedient to use the mixed crystals, ternary solid solutions or pigment compositions of this invention as toners or in the form of preparations.

The mixed crystals, ternary solid solutions and pigment compositions of this invention are used in an amount of 0.01 to 30% by weight, preferably of 0.1 to 10% by weight, based on the high molecular weight organic material to be pigmented.

The pigmenting of the high molecular weight organic materials with the mixed crystals, ternary solid solution and pigment compositions of this invention is conveniently effected by incorporating such mixed crystals or solid solutions by themselves or in the form of masterbatches in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated into the novel mixed crystals or solid solutions before or after working the pigments into the polymers. To obtain different shades, it is also possible to add to the high molecular weight organic materials fillers or other chromophoric components such as white, coloured or black pigments in any amount, in addition to the novel mixed crystals or solid solutions.

For pigmenting paints, coating materials and printing inks, the high molecular weight organic materials and the mixed crystals, ternary solid solutions or pigment composition of this invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The novel mixed crystals, ternary solid solutions and pigment compositions are particularly suitable for colouring plastics, more particularly polyvinyl chloride and polyolefins, and paints, preferably automotive lacquers.

When used for colouring e.g. polyvinyl chloride or polyolefins, the novel mixed crystals as well as the novel ternary solid solutions and pigment compositions have good all-round pigment properties, such as good dispersibility, superior color strength and purity, good fastness to migration, heat, light and weathering as well as good hiding power.

The invention is illustrated by, but not limited to, the following Examples. All parts are parts by weight unless otherwise specified.

EXAMPLE 1 a) 27.94 g (0.128 mol) of di-tert-butyl dicarbonate are added in 3 increments at one hour intervals to a mixture of 14.75 g (0.0512 mol) of 1,4-diketo-3,6-diphenyl-pyrrolo[3,4-c]pyrrole and 3.23 g (0.0264 mol) of 4-dimethylaminopyridine in 500 ml of tetrahydrofuran (dried over a molecular sieve). The red suspension so obtained is stirred for 2 hours at room temperature, with exclusion of atmospheric moisture, to give a dark green solution. The solvent is distilled off under reduced pressure. The yellow residue is washed with a 5% solution of aqueous sodium bicarbonate, rinsed with water and dried under vacuum at room temperature, to give 24.5 g (98% of theory) of N,N-di-tert-butoxy-carbonyl-1,4-diketo-3,6-diphenylpyrrolo[3,4-c]pyrrole.

Analysis:

$^1$H-NMR (CDCl$_3$): 7.75 (d, 4H); 7.48–7.50 (m, 6H); 1.40 (s, 18H).

b) 24.29 g (0.111 mol) of di-tert-butyl dicarbonate are added to a mixture of 8.44 g (0.021 mol) of 1,4-diketo-3,6-di-(4-tert-butylphenyl)pyrrolo[3,4-c]pyrrole and 1.49 g (0.012 mol) of 4-dimethylaminopyridine in 100 ml of N,N-dimethylformamide (dried over a molecular sieve). The red suspension so obtained is stirred for 3 hours at room temperature, with exclusion of atmospheric moisture. The colour changes to orange. The precipitated substance is isolated by filtration, the residue is washed repeatedly with cold distilled water and dried under vacuum at room temperature, to give 11.40 g (90% of theory) of N,N'-ditert-butoxycarbonyl-1,4-diketo-3,6-di-(4-tert-butylphenyl) pyrrolo-[3,4-c]pyrrole as a brilliant yellow product.

Analysis:

$^1$H-NMR (CDCl$_3$): 7.69 (d, 4H); 7.48 (s, 4H); 1.43 (s, 18H); 1.34 (, 18H).

c) A mixture of 1.50 g (3.07 mmol) of N,N'-di-tert-butoxycarbonyl-1,4-diketo-3,6-diphenylpyrrolo[3,4-c]pyrrole (a) and 1.84 g (3.07 mmol) of N,'-di-tert-butoxycarbonyl-1,4-diketo-3,6-di(4-tert-butylphenyl) pyrrolo[3,4-c]pyrrole (b) is dissolved in 100 ml of toluene at room temperature. The yellow solution is heated, with stirring, to 70° C. and then 2.90 g of toluene-4-sulfonic acid monohydrate are added. The mixture is heated to 100° C., stirred at this temperature for 16 hours, and then allowed to cool to room temperature. The solid purple substance so obtained is isolated by filtration, washed first with methanol and then with distilled water and dried in a vacuum drying oven at 60° C., to give 1.86 g (87.9% of theory) of a purple-red powder.

| Analysis: | C | H | N |
|---|---|---|---|
| calcd.: | 76.73% | 5.85% | 8.13% |
| found: | 76.80% | 5.82% | 8.05% |

The complete X-ray diffraction patterns are determined by conventional methods with a Siemens D 500® X-ray diffraction meter (CuK$_\alpha$ irradiation).

The X-ray diffraction pattern is characterized by the following diffraction lines:

| Interplanar spacings (d-values in Å) | Scattering angles (2Θ) | Relative intensity |
|---|---|---|
| 18.9113 | 4.669 | 100 |
| 6.1915 | 14.294 | 7 |
| 4.9491 | 17.908 | 43 |
| 3.3535 | 26.559 | 48 |
| 3.2997 | 27.000 | 22 |

In comparison, the X-ray diffraction pattern of the known asymmetrical diketopyrrolopyrrole of formula (X)

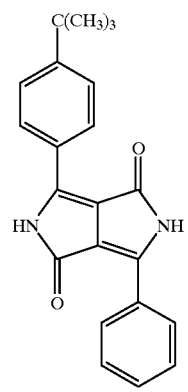

is characterized by the following diffraction lines:

| Interplanar spacings (d-values in Å) | Scattering angles (2Θ) | Relative intensity |
|---|---|---|
| 18.5598 | 4.757 | 100 |
| 6.1761 | 14.329 | 8 |
| 4.9262 | 17.992 | 27 |
| 3.3446 | 26.631 | 32 |
| 3.2901 | 27.080 | 15 |

In PVC and paint colorations, the mixed complex behaves an identical manner to that of the corresponding asymmetrical diketopyrrolopyrrole of formula X.

EXAMPLE 2 a) 1.78 g of 4-dimethylaminopyridine and then 26.8 g of di-tert-butyl dicarbonate are added to a suspension of 20.0 g of 1,4-diketo-3,6-di-(4-chlorophenyl)-pyrrolo[3,4-c]pyrrole in 500 ml of N,N'-dimethylformamide. The reaction mixture is stirred at room temperature, excluding atmospheric moisture. After 15 hours a further 26.8 g of di-tert-butyl dicarbonate are added and stirring is continued for 30 hours. The precipitated brownish orange product is isolated by filtration, washed with methanol and dried under vacuum at room temperature, to give 21.8 g (70% of theory) of the product of formula

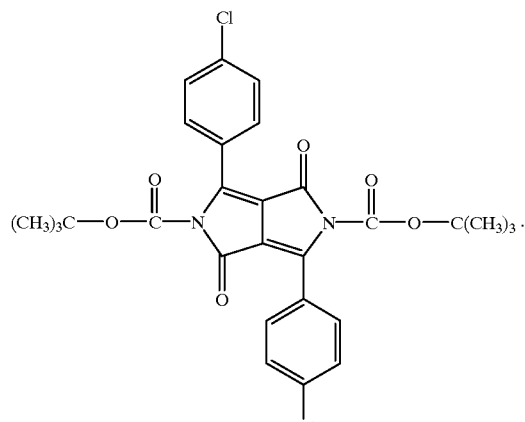

| Analysis: | C | H | N | Cl |
|---|---|---|---|---|
| calcd.: | 60.33% | 4.70% | 5.03% | 12.72% |
| found: | 60.24% | 4.79% | 4.92% | 12.50% | b) 15.2 g of di-tert-butyl dicarbonate are added to a mixture of 10.0 g of 1,4-diketo-3,6-di-(3-methylphenyl) pyrrolo[3,4-c]pyrrole and 1.0 g of 4-dimethylaminopyridine in 350 ml of tetrahydrofuran. The orange suspension so obtained is stirred for 20 hours at room temperature, excluding atmospheric moisture. The solvent is then distilled off under reduced pressure. The brown residue is first washed with water and then with methanol and dried under vacuum at room temperature, to give 14.1 g (86.5% of theory) of a brilliant yellow product of formula

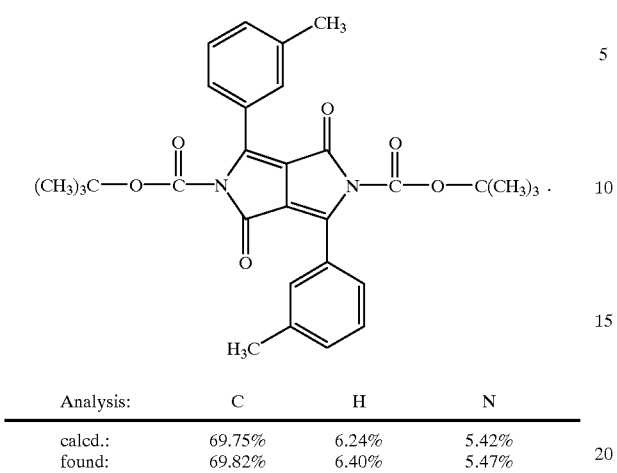

| Analysis: | C | H | N |
|---|---|---|---|
| calcd.: | 69.75% | 6.24% | 5.42% |
| found: | 69.82% | 6.40% | 5.47% | c) A mixture of 6.97 g (12.5 mmol) of the product of a) and 6.46 g (12.5 mmol) of the product of b) in 400 ml of toluene is heated, with stirring, to 60° C. and then 11.89 g of toluene-4-sulfonic acid are added. The mixture is heated to 100° C., stirred at this temperature for 2 hours and then allowed to cool to room temperature. The precipitated product is isolated by filtration, heated in 300 ml of methanol to 60° C. and stirred for 30 minutes at this temperature. The product is then isolated by filtration, washed first with methanol, then with distilled water and dried under vacuum at 60° C., to give 6.8 g (81% of theory) of a red powder.

| Analysis: | C | H | N | Cl |
|---|---|---|---|---|
| calcd.: | 67.76% | 3.89% | 8.32% | 10.53% |
| found: | 66.92% | 3.89% | 8.24% | 11.13% |

The X-ray diffraction pattern is characterized by the following diffraction lines:

| Interplanar spacings (d-values in Å) | Scattering angles (2Θ) | Relative intensity |
|---|---|---|
| 15.3172 | 5.765 | 99 |
| 7.5658 | 11.687 | 14 |
| 6.8504 | 12.913 | 26 |
| 6.3196 | 14.003 | 34 |
| 6.1515 | 14.387 | 48 |
| 5.0223 | 17.645 | 22 |
| 3.6887 | 24.107 | 22 |
| 3.3206 | 26.827 | 100 |
| 3.1567 | 28.248 | 17 |

In comparison, the X-ray diffraction pattern of the known asymmetrical diketopyrrolopyrrole of formula

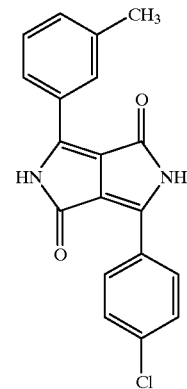

(XI)

is characterized by the following diffraction lines:

| Interplanar spacings (d-values in Å) | Scattering angles (2Θ) | Relative intensity |
|---|---|---|
| 15.3005 | 5.772 | 100 |
| 7.5601 | 11.696 | 13 |
| 6.8195 | 12.971 | 24 |
| 6.2099 | 14.251 | 54 |
| 5.0456 | 17.563 | 24 |
| 3.6945 | 24.069 | 22 |
| 3.3298 | 26.751 | 80 |
| 3.1446 | 28.359 | 17 |

In PVC and paint colorations the mixed complex behaves in identical manner to that of the asymmetrical diketopyrrolopyrrole of formula XI.

EXAMPLE 3 a) (Preparation of the Mixed Crystal)

A mixture of 7.21 g (12.0 mmol) of the product of Example 1b) and 6.69 g (12.0 mmol) of the product of Example 2a) is heated, with stirring, in 380 ml of toluene to 60° C. Then 11.41 g of toluene-4-sulfonic acid are added. The mixture is heated to 100° C., stirred for 2 hours at this temperature and then cooled to room temperature. The precipitated pigment is isolated by filtration, washed first with methanol, then with distilled water and dried under vacuum at 80° C., to give 8.27 g (91% of theory) of a red powder.

| Analysis: | C | H | N | Cl |
|---|---|---|---|---|
| calcd.: | 69.25% | 4.94% | 7.42% | 9.93% |
| found: | 69.67% | 5.05% | 7.40% | 9.32% |

The X-ray diffraction pattern is characterized by the following diffraction lines:

| Interplanar spacings (d-values in Å) | Scattering angles (2Θ) | Relative intensity |
|---|---|---|
| 19.4208 | 4.55 | 59 |
| 6.3517 | 13.93 | 15 |
| 4.9880 | 17.77 | 83 |

| Interplanar spacings (d-values in Å) | Scattering angles (2Θ) | Relative intensity |
| --- | --- | --- |
| 3.7947 | 23.42 | 7 |
| 3.6444 | 24.40 | 7 |
| 3.3649 | 26.47 | 100 |
| 3.2301 | 27.59 | 31 |
| 3.1587 | 28.23 | 8 |
| 3.0305 | 29.45 | 9 | b) (Preparation of the Solid Solution from the Soluble Diketopyrrolopyrroles)

A mixture of 2.40 g (4.0 mmol) of the product of Example 1b) and 3.34 g (6.0 mmol) of the product of Example 2a) is heated, with stirring, in 150 ml of toluene to 60° C. the solution so obtained are added 2.38 g of toluene-4-sulfonic acid monohydrate and heated to 100° C. This mixture is stirred for 2 hours at this temperature and is then allowed to cool to room temperature. The solid red substance so obtained is isolated by filtration, washed first with methanol, then with water and dried in a vacuum drying oven at 80° C., to give 3.5 g (93% of theory) of a red powder.

| Analysis: | C | H | N | Cl |
| --- | --- | --- | --- | --- |
| calcd.: | 67.99% | 4.63% | 7.48% | 11.36% |
| found: | 67.93% | 4.65% | 7.52% | 11.48% |

The X-ray diffraction pattern is characterized by the following diffraction lines:

| Interplanar spacings (d-values in Å) | Scattering angles (2Θ) | Relative intensity |
| --- | --- | --- |
| 19.3152 | 4.57 | 70 |
| 6.3410 | 13.96 | 19 |
| 4.9820 | 17.79 | 89 |
| 3.7899 | 23.45 | 9 |
| 3.6375 | 24.45 | 11 |
| 3.3617 | 26.49 | 100 |
| 3.2272 | 27.62 | 33 |
| 3.1664 | 28.16 | 16 |
| 3.0262 | 29.49 | 11 |

From the above it may be seen that the crystal structure of this solid solution is virtually identical with that of the corresponding mixed crystal (a).

EXAMPLE 4 a) (Preparation of the Soluble Diketopyrrolopyrrole)

0.92 g of 4-dimethylaminopyridine are added to a mixture of 10.15 g of 1,4-diketo-3,6-di-(4-cyanophenyl)pyrrolo[3,4-c]pyrrole and 19.6 g of di-tert-butyl dicarbonate in 400 ml of tetrahydrofuran. The red suspension so obtained is stirred for 20 hours at room temperature, excluding atmospheric moisture. The solvent is distilled off under reduced pressure. The brown residue is washed with methanol and dried under vacuum at room temperature, to give 10.6 g (66% of theory) of N,'-di-tert-butoxycarbonyl-1,4-diketo-3,6-di-(4-cyanophenyl)pyrrolo[3,4-c]pyrrole.

| Analysis: | C | H | N |
| --- | --- | --- | --- |
| calcd.: | 66.91% | 4.87% | 10.40% |
| found: | 66.84% | 5.02% | 10.32% | b) (Preparation of the Mixed Crystal)

A mixture of 6.69 g (12.0 mmol) of the product of Example 2a) and 6.46 g (12.0 mmol) of the product of a) is heated, with stirring, in 380 ml of toluene to 60° C. Subsequently, 11.41 g of toluene-4-sulfonic acid are added, and the mixture is heated to 100° C., stirred for 1.5 hours at this temperature and then cooled to room temperature, to give 8.40 g of a purple powder.

| Analysis: | C | H | N | Cl |
| --- | --- | --- | --- | --- |
| calcd.: | 65.76% | 2.90% | 12.20% | 9.92% |
| found: | 64.55% | 3.12% | 12.00% | 9.62% |

The X-ray diffraction pattern is characterized by the following diffraction lines:

| Interplanar spacings (d-values in Å) | Scattering angles (2Θ) | Relative intensity |
| --- | --- | --- |
| 15.5974 | 5.66 | 58 |
| 7.8658 | 11.24 | 25 |
| 6.5248 | 13.56 | 31 |
| 6.0649 | 14.59 | 36 |
| 3.8137 | 23.31 | 21 |
| 3.3093 | 26.92 | 100 |
| 2.9923 | 29.84 | 24 | c) (Preparation of the Solid Solution by Alkaline Precipitation)

A suspension of 1.43 g (4.0 mmol) of 1,4-diketo-3,6-di-(4-chlorophenyl)pyrrolo-[3,4-c]pyrrole, 2.03 g (6.0 mmol) of 1,4-diketo-3,6-di-(4-cyanophenyl)pyrrolo-[3,4-c]pyrrole and 1.24 g of potassium hydroxide in 75 ml of dimethylsulfoxide is heated to 50° C. and stirred at this temperature for 2 hours. The reaction mixture is then cooled to room temperature and forced into a mixture of 150 ml of water and 2.2 ml of hydrochloric acid (fuming, 37%) and then stirred at room temperature for 4 hours. The red mixture is subjected to filtration and the filter cake is washed with methanol and then with water and the pigment is dried under vacuum at 80° C., to give 3.2 g of a red powder.

| Analysis: | C | H | N | Cl |
| --- | --- | --- | --- | --- |
| calcd.: | 66.68% | 2.91% | 12.96% | 8.20% |
| found: | 66.02% | 3.01% | 12.75% | 8.02% |

The X-ray diffraction pattern is characterized by the following diffraction lines:

| Interplanar spacings (d-values in Å) | Scattering angles (2Θ) | Relative intensity |
| --- | --- | --- |
| 16.0744 | 5.49 | 100 |
| 7.8749 | 11.23 | 30 |
| 6.5456 | 13.52 | 36 |
| 6.0875 | 14.54 | 48 |
| 3.7996 | 23.39 | 28 |
| 3.2872 | 27.11 | 100 |
| 3.0003 | 29.75 | 26 |

From the above it may be seen that the crystal structure of this solid solution is virtually identical to that of the corresponding mixed crystal (b).

EXAMPLE 5a)

(Preparation of the Soluble Diketopyrrolopyrrole)

27.3 g of di-tert-butyl dicarbonate and then 1.53 g of 4-dimethylaminopyridine are added to a suspension of 17.9 g of 1,4-diketo-3,6-di-(3-chlorophenyl)pyrrolo[3,4-c]pyrrole in 500 ml of tetrahydrofuran. The reaction mixture is stirred for 24 hours at room temperature, excluding atmospheric moisture. The solvent is then distilled off under reduced pressure. The residue is washed with methanol and then dried under vacuum at room temperature, to give 24.8 g (89% of theory) of N,N'-di-tert-butoxycarbonyl-1,4-diketo-3,6-di-(3-chlorophenyl)pyrrolo[3,4-c]pyrrole as a brilliant yellow product.

| Analysis: | C | H | N | Cl |
| --- | --- | --- | --- | --- |
| calcd.: | 60.33% | 4.70% | 5.03% | 12.72% |
| found: | 60.33% | 4.79% | 5.03% | 12.72% | b) (Preparation of the Mixed Crystal from the Soluble Diketopyrrolopyrrole)

A mixture of 4.89 g (10.0 mmol) of the product of Example 1a) and 5.57 g (10.0 mmol) of the product of a) is heated, with stirring, in 350 ml of toluene to 60° C. the solution so obtained are added 9.51 g of toluene-4-sulfonic acid monohydrate and the mixture is heated to 105° C. and then allowed to cool to room temperature. The solid substance so obtained is isolated by filtration, washed first with methanol and then with water and dried under vacuum at 80° C., to give 6.1 g of a red powder.

| Analysis: | C | H | N | Cl |
| --- | --- | --- | --- | --- |
| calcd.: | 66.99% | 3.44% | 8.68% | 10.98% |
| found: | 66.48% | 3.42% | 8.68% | 11.25% |

The X-ray diffraction pattern is characterized by the following diffraction lines:

| Interplanar spacings (d-values in Å) | Scattering angles (2Θ) | Relative intensity |
| --- | --- | --- |
| 14.3114 | 6.17 | 92 |
| 6.7532 | 13.10 | 52 |
| 6.4304 | 13.76 | 25 |
| 5.8638 | 15.10 | 25 |
| 4.7102 | 18.83 | 35 |
| 3.7250 | 23.87 | 33 |
| 3.4730 | 25.63 | 44 |
| 3.2671 | 27.27 | 100 |
| 2.3366 | 38.50 | 11 | c) (Preparation of the Mixed Crystal by Alkaline Precipitation)

A mixture of 2.02 g (7.0 mmol) of 1,4-diketo-3,6-diphenylpyrrolo[3,4-c]pyrrole, 2.50 g (7.0 mmol) of 1,4-diketo-3,6-di-(3-chlorophenyl)pyrrolo[3,4-c]pyrrole and 1.24 g of sodium hydroxide in 100 ml of 1-methyl-2-pyrrolidone is stirred for 24 hours at room temperature. The reaction mixture is then charged over 70 minutes to a mixture of 100 ml of methanol, 100 ml of water and 1.67 ml of concentrated sulfuric acid and then stirred at room temperature for 6 hours. The red mixture is isolated by filtration, washed with water and dried under vacuum at 60° C., to give 4.1 g (87% of theory) of a red powder.

| Analysis: | C | H | N | Cl |
| --- | --- | --- | --- | --- |
| calcd.: | 66.99% | 3.44% | 8.68% | 10.98% |
| found: | 66.68% | 3.47% | 8.68% | 10.84% |

The X-ray diffraction pattern is characterized by the following diffraction lines:

| Interplanar spacings (d-values in Å) | Scattering angles (2Θ) | Relative intensity |
| --- | --- | --- |
| 14.2590 | 6.19 | 100 |
| 6.7650 | 13.08 | 41 |
| 6.4380 | 13.74 | 24 |
| 5.9045 | 14.99 | 22 |
| 4.7043 | 18.85 | 39 |
| 3.7186 | 23.91 | 32 |
| 3.4688 | 25.66 | 40 |
| 3.2725 | 27.23 | 89 |
| 2.3380 | 38.47 | 10 | d) (Preparation of the Solid Solution by Alkaline Precipitation)

A mixture of 1.73 g (6.0 mmol) of 1,4-diketo-3,6-diphenylpyrrolo[3,4-c]pyrrole, 1.43 g (4.0 mmol) of 1,4-diketo-3,6-di-(3-chlorophenyl)pyrrolo[3,4-c]pyrrole and 0.88 g of sodium hydroxide in 75 ml of 1-methyl-2-pyrrolidone is heated to 50° C. and stirred overnight at this temperature. The reaction mixture is then cooled to room temperature and charged over 75 minutes to a mixture of 75 ml of methanol, 75 ml of water and 1.2 ml of concentrated sulfuric acid at 10° C. and then stirred at room temperature for 20 hours. The red mixture is filtered off, washed with methanol and then with water and dried under vacuum at 60° C., to give 2.7 g (85% of theory) of a red powder.

| Analysis: | C | H | N | Cl |
|---|---|---|---|---|
| calcd.: | 69.20% | 3.65% | 8.97% | 7.94% |
| found: | 68.05% | 3.64% | 8.92% | 8.60% |

The X-ray diffraction pattern is characterized by the following diffraction lines:

| Interplanar spacings (d-values in Å) | Scattering angles (2Θ) | Relative intensity |
|---|---|---|
| 14.4039 | 6.13 | 100 |
| 6.7881 | 13.03 | 34 |
| 6.4211 | 13.78 | 22 |
| 5.9361 | 14.91 | 20 |
| 4.7087 | 18.83 | 34 |
| 3.7402 | 23.77 | 30 |
| 3.4720 | 25.64 | 32 |
| 3.2886 | 27.09 | 80 |
| 2.3381 | 38.47 | 10 |

From the above it may be seen that the crystal structure of this solid solution is virtually identical with that of the corresponding mixed crystal (b & c).

EXAMPLE 6

4 is repeated, with the sole exception that the 1,4-diketo-3,6-di-(4-cyanophenyl)pyrrolo[3,4-c]pyrrole is replaced with the equivalent amount of 1,4-diketo-3,6-diphenylpyrrolo[3,4-c]pyrrole. A mixed crystal is obtained whose crystal structure is virtually identical with that of the corresponding asymmetrical diketopyrrolopyrrole of formula

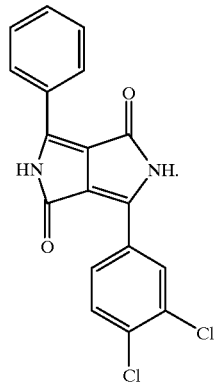

| Analysis: | C | H | N | Cl |
|---|---|---|---|---|
| calcd: | 66.99% | 3.44% | 8.68% | 10.98% |
| found: | 66.36% | 3.50% | 8.63% | 11.02% |

EXAMPLE 7

1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3-cyanophenyl)pyrrolo[3,4-c]pyrrole. A mixed crystal is obtained whose crystal structure is virtually identical with that of the corresponding asymmetrical diketopyrrolopyrrole of formula

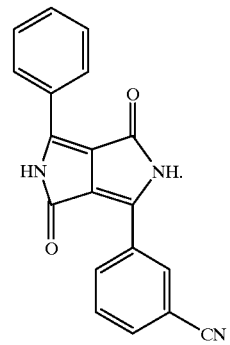

| Analysis: | C | H | N |
|---|---|---|---|
| calcd.: | 72.84% | 3.54% | 13.41% |
| found: | 72.07% | 3.63% | 13.15% |

EXAMPLE 8

1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3,4-dichlorophenyl)pyrrolo[3,4-c]pyrrole. A mixed crystal is obtained whose crystal structure is virtually identical to that of the corresponding asymmetrical diketopyrrolopyrrole of formula

| Analysis: | C | H | N | Cl |
|---|---|---|---|---|
| calcd.: | 60.53% | 2.82% | 7.84% | 19.85% |
| found: | 60.47% | 2.95% | 7.83% | 19.55% |

EXAMPLE 9

4c) is repeated, with the exception that 4.0 mmol of 1,4-diketo-3,6-di-(4-chlorophenyl)pyrrolo[3,4-c]pyrrole and 6.0 mmol of 1,4-diketo-3,6-di-(4-cyanophenyl)pyrrolo[3,4-c]pyrrole are replaced with 5.0 mmol of 1,4-diketo-3,6-di-(4-chlorophenyl)pyrrolo[3,4-c]pyrrole and 5.0 mmol of 1,4-diket-3,6-di-(3,4-dichloro-phenyl)pyrrolo[3,4-c]pyrrole, and 1.24 g of potassium hydroxide and 75 ml of dimethylsulfoxide are replaced with 1.68 g of potassium hydroxide and 70 ml of dimethyssulfoxide. A mixed crystal is obtained whose crystal structure is virtually identical with that of the corresponding asymmetrical diketopyrrolopyrrole of formula

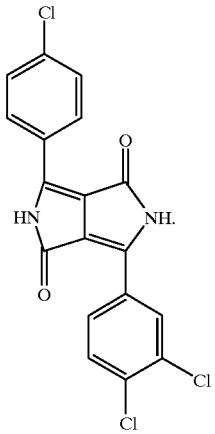

| Analysis: | C | H | N | Cl |
|---|---|---|---|---|
| calcd.: | 55.20% | 2.32% | 7.15% | 27.16% |
| found: | 55.14% | 2.47% | 7.11% | 26.53% |

EXAMPLE 10

1 is repeated, with the sole exception that the 1,4-diketo-3,6-di-(4-tert-butylphenyl)pyrrolo[3,4-c]pyrrole is replaced with the equivalent amount of 1,4-diketo-3,6-di-(3-methylphenyl)pyrrolo[3,4-c]pyrrole. A mixed crystal is obtained whose crystal structure is virtually identical with that of the corresponding asymmetrical diketopyrrolopyrrole of formula

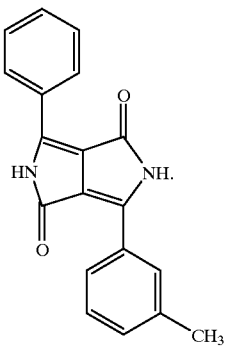

| Analysis: | C | H | N |
|---|---|---|---|
| calcd.: | 75.48% | 4.67% | 9.27% |
| found: | 75.12% | 4.75% | 9.21% |

EXAMPLE 11

1 is repeated, with the sole exception that 1,4-diketo-3,6-diphenylpyrrolo-[3,4-c]pyrrole and 1,4-diketo-3,6-di-(4-tert-butylphenyl)pyrrolo[3,4-c]pyrrole are replaced with the equivalent amount of 1,4-diketo-3,6-di-(4-chlorophenyl)pyrrolo[3,4-c]pyrrole and 1,4-diketo-3,6-di-(4-methylphenyl)pyrrolo[3,4-c]pyrrole. A mixed crystal is obtained whose crystal structure is virtually identical with that of the corresponding asymmetrical diketopyrrolopyrrole of formula

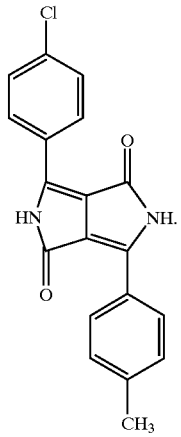

| Analysis: | C | H | N | Cl |
|---|---|---|---|---|
| calcd.: | 67.76% | 3.89% | 8.32% | 10.53% |
| found: | 67.52% | 4.00% | 8.26% | 10.68% |

EXAMPLE 12

11 is repeated, with the sole exception that the 1,4-diketo-3,6-di-(4-methylphenyl)pyrrolo[3,4-c]pyrrole is replaced with the equivalent amount of 1,4-diketo-3,6-di-(3-cyanophenyl)pyrrolo[3,4-c]pyrrole. A mixed crystal is obtained whose crystal structure is virtually identical with that of the corresponding asymmetrical diketopyrrolopyrrole of formula

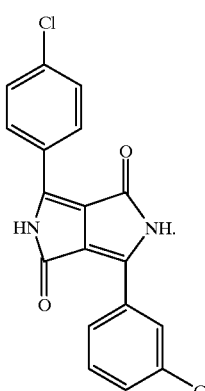

| Analysis: | C | H | N | Cl |
|---|---|---|---|---|
| calcd.: | 65.76% | 2.90% | 12.20% | 9.92% |
| found: | 65.16% | 3.17% | 11.88% | 10.06% |

EXAMPLE 13

A suspension of 1.61 g (4.5 mMol) of 1,4-diketo-3,6-di-(4'-chlorophenyl)-pyrrolo-[3,4-c]-pyrrole, 1.80 g (4.5 mMol) of 1,4-diketo-3,6-di-(4'-tert-butylphenyl)-pyrrolo-[3,4-c]pyrrol, 0.28 g (0.9 mMol) of β-quinacridone and 1.22 g (21.78 mMol) of potassium hydroxide in 100 ml of dimethyl sulfoxide is heated to 50° C. and stirred at this temperature for 2 hours. The red reaction mixture is then cooled to room temperature and transferred to a well stirred solution of 2.23 g (21.78 mMol) of sulphuric acid (96%) in 300 ml water at 0° C. The resulting red suspension is stirred at 0° C. for 2 more hours and then allowed to warm up to room temperature. The product is collected by filtration, washed with 300 ml of methanol followed by 300 ml water, dried under vacuum at 80° C. and pulverized. This yields 2.92 g of a dark red pigment (79% of the theoretical).

| Analysis: | C | H | N | Cl |
|---|---|---|---|---|
| calculated: | 69.95% | 4.84% | 7.56% | 9.02% |
| found: | 68.75% | 4.78% | 7.51% | 9.60% |

The X-ray diffraction pattern is characterized by the following diffraction lines:

| Interplanar spacing (d-value in Å) | Scattering angle (2Θ) | Relative intensity (%) |
|---|---|---|
| 19.62 | 4.50 | 98 |
| 6.39 | 13.83 | 38 |
| 4.96 | 17.86 | 100 |
| 3.78 | 23.49 | 18 |
| 3.63 | 24.47 | 23 |
| 3.36 | 26.44 | 89 |
| 3.28 | 27.13 | 51 |
| 3.16 | 28.17 | 28 |
| 3.04 | 29.39 | 25 |

By comparison with the mixed crystal of 1,4-diketo-3,6-di-(4'-chlorophenyl)-pyrrolo-[3,4-c]-pyrrole and 1,4-diketo-3,6-di-(4'-tert-butylphenyl)-pyrrolo-[3,4-c]-pyrrole (Example 3a) it can be seen that the solid solution is in the crystal lattice of the mixed crystal (the host).

EXAMPLE 14

In the same way as in Example 13 except that 0.31 g (0.9 mMol) of 2,9-dimethylquinacridone is used in place of β-quinacridone, there is obtained 3.36 g (90% of the theoretical) of a deep red pigment.

| Analysis: | C | H | N | Cl |
|---|---|---|---|---|
| calculated: | 70.01% | 4.92% | 7.49% | 9.02% |
| found: | 69.83% | 5.12% | 7.40% | 8.59% |

The X-ray diffraction pattern is characterized by the following diffraction lines:

| Interplanar spacing (d-value in Å) | Scattering angle (2Θ) | Relative intensity (%) |
|---|---|---|
| 19.69 | 4.48 | 91 |
| 6.37 | 13.89 | 30 |
| 4.97 | 17.84 | 100 |
| 3.80 | 23.40 | 17 |
| 3.64 | 24.46 | 22 |
| 3.37 | 26.46 | 85 |
| 3.26 | 27.35 | 43 |
| 3.04 | 29.39 | 24 |

By comparison with the mixed crystal of 1,4-diketo-3,6-di-(4'-chlorophenyl)-pyrrolo-[3,4-c]-pyrrole and 1,4-diketo-3,6-di-(4'-tert-butylphenyl)-pyrrolo-[3,4-c]-pyrrole (Example 3a) it can be seen that the solid solution is in the crystal lattice of the mixed crystal (the host).

EXAMPLE 15

A mixture containing 1.60 g (4.5 mMol) of 1,4-diketo-3,6-di-(4'-chloro-phenyl)-pyrrolo-[3,4-c]-pyrrole, 1.80 g (4.5 mMol) of 1,4-diketo-3,6-di-(4'-tert-butyl-phenyl)-pyrrolo-[3,4-c]-pyrrole, 0.38 g (1.0 mMol) of 2,9-dichloroquinacridone and 1.68 g (29.9 mMol) of potassium hydroxide in 110 ml of tert-amyl alcohol is heated to 100° C. and stirred at this temperature for 1 hour. A part of the solvent (ca 40 ml) is then distilled off. The resulting violet coloured mixture is cooled to 50° C. and transferred to a well stirred mixture of 0.88 ml (15 mMol) of sulphuric acid (92%), 100 ml of water and 100 ml of methanol. The red suspension thus obtained is stirred at room temperature for 2 more hours and then filtered. The press cake is washed with 300 ml of methanol followed by 500 ml of water, dried at 60° C. under vacuum and pulverized. This gives 2.8 g (74% of the theoretical) of a red pigment.

| Analysis: | C | H | N | Cl |
|---|---|---|---|---|
| calculated: | 68.63% | 4.70% | 7.41% | 10.79% |
| found: | 67.21% | 4.66% | 7.11% | 11.03% |

The X-ray diffraction pattern is characterized by the following diffraction lines: Interplanar spacing Scattering angle Relative intensity

| Interplanar spacing (d-value in Å) | Scattering angle (2Θ) | Relative intensity (%) |
|---|---|---|
| 19.26 | 4.58 | 100 |
| 6.35 | 13.94 | 38 |
| 4.94 | 17.94 | 91 |
| 3.80 | 23.41 | 18 |
| 3.63 | 24.49 | 21 |
| 3.35 | 26.57 | 81 |
| 3.25 | 27.40 | 40 |
| 3.02 | 29.56 | 20 |

By comparison with the mixed crystal of 1,4-diketo-3,6-di-(4'-chlorophenyl)-pyrrolo-[3,4-c]-pyrrole and 1,4-diketo-3,6-di-(4'-tert-butylphenyl)-pyrrolo-[3,4-c]-pyrrole (Example 3a) it can be seen that the solid solution is in the crystal lattice of the mixed crystal (the host).

EXAMPLE 16

A mixture of 1.80 g (4.5 mMol) of 1,4-diketo-3,6-di-(4'-tert-butylphenyl)-pyrrolo-[3,4-c]-pyrrole, 1.30 g (4.5 mMol) of 1,4-diketo-3,6-diphenyl-pyrrolo-[3,4-c]-pyrrole, 0.31 g (1.0 mMol) of β-quinacridone and 1.68 g (29.9 mMol) of potassium hydroxide in 50 ml of dimethyl sulfoxide is heated to 50° C. and stirred at this temperature for 1 hour. The violet coloured reaction mixture is transferred to a well stirred mixture containing 0.88 ml (15 mMol) of sulphuric acid (92%), 100 ml of water and 100 ml of methanol. The resulting red suspension is stirred at room temperature for 2 more hours and filtered. The press cake is washed with 500 ml of methanol followed by 500 ml of water and dried at 60° C. under vacuum. This yields 3.05 g (89% of the theoretical) of a red pigment.

| Analysis: | C | H | N |
|---|---|---|---|
| calculated: | 76.53% | 5.45% | 8.42% |
| found: | 76.20% | 5.67% | 8.25% |

The X-ray diffraction pattern is characterized by the following diffraction lines:

| Interplanar spacing (d-value in Å) | Scattering angle (2Θ) | Relative intensity (%) |
|---|---|---|
| 19.19 | 4.60 | 100 |
| 6.20 | 14.26 | 16 |
| 4.96 | 17.86 | 61 |
| 3.36 | 26.49 | 65 |
| 3.31 | 26.93 | 39 |
| 3.01 | 29.69 | 9 |

By comparison with the mixed crystal of 1,4-diketo-3,6-di-(4'-tert-butylphenyl)-pyrrolo-[3,4-c]-pyrrole and 1,4-diketo-3,6-diphenyl-pyrrolo-[3,4-c]-pyrrole (Example 1c) it can be seen that the solid solution is in the crystal lattice of the mixed crystal (the host).

EXAMPLE 17

A mixture of 1.68 g (4.7 mMol) of 1,4-diketo-3,6-di-(4'-chlorophenyl)-pyrrolo-[3,4-c]-pyrrole, 1.49 g (4.7 mMol) of 1,4-diketo-3,6-di-(3'-methylphenyl)-pyrrolo-[3,4-c]-pyrrole, 0.23 g (0.6 mMol) of 2,9-dichloroquinacridone and 1.68 g (29.9 mMol) of potassium hydroxide in 50 ml of dimethyl sulfoxide is treated in the same way as described in Example 16 above, to yield 3.05 g (90% of the theoretical) of an orange coloured pigment.

| Analysis: | C | H | N | Cl |
|---|---|---|---|---|
| calculated: | 67.92% | 3.89% | 8.29% | 10.45% |
| found: | 66.58% | 3.83% | 8.15% | 11.19% |

The X-ray diffraction pattern is characterized by the following diffraction lines:

| Interplanar spacing (d-value in Å) | Scattering angle (2Θ) | Relative intensity (%) |
|---|---|---|
| 15.83 | 5.58 | 56 |
| 7.60 | 11.63 | 15 |
| 6.84 | 12.94 | 34 |
| 6.31 | 14.03 | 44 |
| 6.19 | 14.29 | 49 |
| 5.10 | 17.37 | 17 |
| 5.06 | 17.50 | 17 |
| 3.72 | 23.90 | 31 |
| 3.33 | 26.73 | 100 |
| 3.17 | 28.11 | 22 |
| 3.15 | 28.35 | 20 |

By comparison with the mixed crystal of 1,4-diketo-3,6-di-(4'-chlorophenyl)-pyrrolo-[3,4-c]-pyrrole and 1,4-diketo-3,6-di-(3'-methylphenyl)-pyrrolo-[3,4-c]-pyrrole (Example 2c) it can be seen that the solid solution is in the crystal lattice of the mixed crystal (the host).

EXAMPLE 18

A mixture of 1.55 g (4.35 mMol) of 1,4-diketo-3,6-di-(4'-chlorophenyl)-pyrrolo-[3,4-c]-pyrrole, 1.38 g (4.35 mMol) of 1,4-diketo-3,6-di-(3'-methylphenyl)-pyrrolo-[3,4-c]-pyrrole, 0.41 g (1.3 mMol) of 1,4-diketo-3,6-di-(4'-methylphenyl)-pyrrolo-[3,4-c]-pyrrole and 1.68 g (29.9 mMol) of potassium hydroxide in 110 ml of tert-amyl alcohol is treated in the same way as described in Example 15 above, to yield 2.6 g (78% of the theoretical) of an orange coloured pigment.

| Analysis: | C | H | N | Cl |
|---|---|---|---|---|
| calculated: | 68.77% | 4.04% | 8.38% | 9.23% |
| found: | 65.38% | 3.93% | 7.79% | 9.59% |

The X-ray diffraction pattern is characterized by the following diffraction lines:

| Interplanar spacing (d-value in Å) | Scattering angle (2Θ) | Relative intensity (%) |
|---|---|---|
| 16.33 | 5.41 | 73 |
| 7.19 | 12.29 | 27 |
| 6.67 | 13.26 | 38 |
| 6.38 | 13.87 | 45 |
| 6.27 | 14.10 | 49 |
| 6.17 | 14.34 | 49 |
| 5.11 | 17.35 | 22 |
| 3.75 | 23.72 | 28 |
| 3.35 | 26.61 | 100 |
| 3.15 | 28.27 | 24 |
| 3.01 | 29.65 | 24 |
| 2.91 | 30.68 | 24 |

It can be seen that the solid solution is in the crystal lattice of the mixed crystal (the host) of 1,4-diketo-3,6-di-(4'-chlorophenyl)-pyrrolo-[3,4-c]-pyrrole and 1,4-diketo-3,6-di-(3'-methylphenyl)-pyrrolo-[3,4-c]-pyrrole (Example 2c).

19: A mixture of 1.60 g (3.99 mMol) of 1,4-diketo-3,6-di-(4'-tert-butylphenyl)-pyrrolo-[3,4-c]-pyrrole, 1.15 g (3.99 mMol) of 1,4-diketo-3,6-diphenyl-pyrrolo-[3,4-c]-pyrrole, 0.67 g (1.98 mMol) of 1,4-diketo-3,6-di-(4'-cyanophenyl)-pyrrolo-[3,4-c]-pyrrole and 1.68 g (29.9 mMol) of potassium hydroxide in 50 ml of methyl sulfoxide is treated in the same manner as described in Example 16, yielding 2.95 g (86% of the theoretical) of a red pigment.

| Analysis: | C | H | N |
|---|---|---|---|
| calculated: | 75.39% | 5.10% | 10.00% |
| found: | 74.49% | 5.28% | 9.76% |

The X-ray diffraction pattern is characterized by the following diffraction lines:

| Interplanar spacing (d-value in Å) | Scattering angle (2Θ) | Relative intensity (%) |
|---|---|---|
| 19.96 | 4.42 | 100 |
| 6.46 | 13.70 | 15 |
| 6.08 | 14.56 | 14 |
| 4.96 | 17.87 | 51 |
| 3.35 | 26.57 | 63 |

It can be seen that the solid solution is in the crystal lattice of the mixed crystal (the host) of 1,4-diketo-3,6-di-(4'-tert-butylphenyl)-pyrrolo-[3,4-c]-pyrrole and 1,4-diketo-3,6-diphenyl-pyrrolo-[3,4-c]-pyrrole (Example 1c).

20:7.5 g of the solid solution of Example 13, 98.9 g of a CAB solution consisting of 41.0 g of cellulose acetobutyrate ®CAB 531.1, 20% in butanovxylene 2:1 (Eastman Chem.)

1.5 g of zirconium octoate, 18.5 g of ®SOLVESSO 150 (aromatic hydrocarbons; ESSO), 21.5 g of butyl acetate, and 17.5 g of xylene, 36.5 g of polyester resin ®DNAPOL H700 (Dynamit Nobel), 4.6 g of melamine resin MAPRENAL MF650 (Hoechst) and 2.5 g of dispersant ®DISPERBYK 160 (Byk Chemie) are dispersed together over 90 minutes in a disperser (total varnish: 150 g; 5% of pigment).

For the base coat layer, 27.69 g of the mass-tone varnish so obtained are mixed with 17.31 g of Al stock solution (8%) consisting of 12.65 g of ®SILBERLINE SS 3334AR, 60% (Silberline Ltd.)

56.33 g of CAB solution (composition as above)

20.81 g of polyester resin ®DYNAPOL H700

2.60 g of melamine resin ®MAPRENAL MF650

7.59 g of ®SOLVESSO 150 and sprayed onto an aluminium sheet (wet film c. 20 μm). After drying in the air for 30 minutes at room temperature, a TSA varnish consisting of 29.60 g of acrylic resin ®URACRON 2263 XB, 50% in xylene/butanol (Chem. Fabrik Schweizerhalle), 5.80 g of melamine resin ®CYMEL 327, 90% in isobutanol, 2.75 g of butyl glycol acetate, 5.70 g of xylene, 1.65 g of n-butanol 0.50 g of silicone oil, 1% in xylene, 3.00 g of light stabiliser ®TINUVIN 900, 10% in xylene (Ciba)

1.00 g of light stabiliser ®TINUVIN 292, 10% in xylene (Ciba)

is sprayed thereon as top coat finish (wet film c. 50 μm). After drying in the air for a further 30 minutes at room temperature, the varnish is stoved for 30 minutes at 130° C.

EXAMPLE 21

0.6 g of the solid solution of Example 14 is mixed with 67 g of polyvinyl chloride, 33 g of dioctylphthalate, 2 g of dibutyl tin dilaurate and 2 g of titanium dioxide and processed on a roll mill for 15 minutes at 160° C. to a thin film. The PVC film so obtained has superior colour strength and is resistant to migration and light.

EXAMPLE 22

1000 g of polypropylene granulate (®DAPLEN PT-55, Chemie LINZ) and 20 g of a 50% pigment preparation, consisting of 10 g of the solid solution of Example 18 and 10 g of Mg behenate, are thoroughly mixed in a mixer drum. The granulate so treated is then spun according to the melt spinning process in the temperature range from 260 to 285° C. Red filaments are obtained having excellent light and textile fastness properties. A RIGAKU model D-MAX-B with a CU-Kα source is used to record all x-ray diffraction patterns reported in Examples 23 to 34.

EXAMPLE 23

Equimolar (rounded to first decimal to make up a total of 10.0 g.) amounts of unsubstituted DPP (4.2 g; 0.0146 moles) and dibutyl DPP (5.8 g; 0.0145 moles), as well as dimethyl glutarate (1.0 g) and aluminum sulfate $(Al_2(SO_4)_3 \cdot 15-18 H_2O$; 40.0 g) are added to a 1000 ml ball mill containing steel balls (1500 g; 1.2 cm diameter) and nails (150 g; 3.0 cm length) as grinding media. The mill is tightly closed and rolled on a roller for 24 hours. The contents of the mill are then discharged and separated from the milling media. The mill powder thus obtained is stirred with 2% aqueous sulfuric acid (500 ml) for 2 hours at 90° C. The resulting pigment slurry is filtered, washed with hot water until neutral and free of salts and then dried.

A rubout of the resulting pigment shows a very bluish red color which is similar to that a commercial perylene red pigment, but far superior in color saturation. The resulting pigment is a binary mixed crystal characterized by the following x-ray diffraction pattern:

| Scattering angle (2Θ) | Relative intensity (%) |
|---|---|
| 4.74 | 100 |
| 6.42 | 8 |
| 14.38 | 11 |
| 17.98 | 50 |
| 19.15 | 11 |
| 21.23 | 7 |
| 24.55 | 7 |
| 26.64 | 59 |
| 29.82 | 8 |

EXAMPLE 24

Following the procedure used in example 23, a pigment is prepared using unsubstituted DPP(3.3 g; 0.0115 moles), dibutyl DPP(4.7 g; 0.01 18 moles) and 2,9-dichlorquinacridone (2.0 g; 0.0053 moles).

The resulting pigment shows a dark masstone and is similar in color to the binary solid solution described in Example 23. The resulting ternary solid solution shows an x-ray diffraction pattern that is essentially the same as the binary solid compound of example 23 indicating a Guest-Host solid solution wherein the binary solid compound serves as a host to 2,9-dichloroquinacridone. The x-ray diffraction pattern is characterized by the following diffraction lines:

| Scattering angle (2Θ) | Relative intensity (%) |
|---|---|
| 4.78 | 100 |
| 14.46 | 14 |
| 18.03 | 46 |
| 19.06 | 13 |
| 23.14 | 9 |
| 24.60 | 10 |
| 26.68 | 64 |

EXAMPLE 25

Following the procedure in Example 23, a pigment is prepared using unsubstituted DPP(3.3 g; 0.0115 moles), dibutyl DPP(4.7 g; 0.0118 moles) and dichloro DPP(2.0 g; 0.0056 moles).

The resulting ternary solid solution showed an X-ray diffraction pattern which is essentially the same as the binary solid compound described in example 23 indicating a Guest-Host solid solution wherein the binary solid compound served as a host to dichloro DPP. The x-ray diffraction pattern is characterized by the following diffraction lines:

| Scattering angle (2Θ) | Relative intensity (%) |
|---|---|
| 4.65 | 100 |
| 6.45 | 20 |
| 14.06 | 14 |
| 14.80 | 11 |
| 18.02 | 68 |
| 19.26 | 13 |
| 23.93 | 8 |
| 24.57 | 11 |
| 26.68 | 75 |
| 28.32 | 16 |
| 29.64 | 12 |

EXAMPLE 26

A pigment is prepared according to Example 23, using equimolar quantities of dichloro DPP(4.7 g; 0.0132 moles) and dibutyl DPP(5.3 g; 0.0133 moles) instead of unsubstituted DPP and dibutyl DPP.

The resulting binary solid compound pigment is a close color match to a commercial perylene pigment and is characterized by the following x-ray diffraction pattern:

| Scattering angle (2Θ) | Relative intensity (%) |
|---|---|
| 4.60 | 100 |
| 8.41 | 13 |
| 14.00 | 25 |
| 17.93 | 75 |
| 23.52 | 14 |
| 24.56 | 14 |
| 26.56 | 81 |
| 27.65 | 30 |
| 29.52 | 15 |

EXAMPLE 27

Following the procedure used in Example 23, a pigment is prepared using dichloro DPP(3.8 g; 0.0105 moles), dibutyl DPP(4.2 g; 0.01 moles) and 2,9-dichloroquinacridone (2.0 g; 0.0053 moles).

The resulting ternary solid solution showed an X-ray diffraction pattern which is substantially identical to that of the binary solid compound described in example 26 indicating a Guest-Host solid solution wherein the binary solid compound served as a host to 2,9-dichloroquinacridone. The x-ray diffraction pattern is characterized by the following lines:

| Scattering angle (2Θ) | Relative intensity (%) |
|---|---|
| 4.60 | 100 |
| 13.99 | 29 |
| 15.18 | 17 |
| 17.92 | 86 |
| 23.41 | 21 |
| 24.56 | 20 |
| 26.57 | 90 |
| 27.70 | 54 |
| 29.54 | 20 |

The pigment shows a dark masstone and is similar in color to the binary solid compound described in example 26.

Example 28

Following the procedure used in example 23, a pigment is prepared using unsubstituted DPP(2.0 g; 0.0069 moles), dibutyl DPP (4.2 g; 0.0105 moles) and dichloro DPP(3.8 g; 0.0106 moles).

The resulting ternary solid solution shows an x-ray diffraction pattern which is substantially identical to the binary solid compound described in example 26 indicating a Guest-Host solid solution wherein the binary solid compound served as a host to unsubstituted DPP. The rub out evaluation revealed the pigment to be in the same color space as that of a commercial perylene pigment. The x-ray diffraction pattern is characterized by the following lines:

| Scattering angle (2Θ) | Relative intensity (%) |
|---|---|
| 4.63 | 100 |
| 5.70 | 21 |
| 13.99 | 21 |
| 14.96 | 13 |
| 18.03 | 71 |
| 23.49 | 13 |
| 24.56 | 13 |
| 26.72 | 77 |
| 27.98 | 17 |
| 29.56 | 15 |

EXAMPLE 29

Following the procedure used in example 23, a pigment is prepared using unsubstituted DPP(4.3 g; 0.0149 moles), dibutyl DPP (3.0 g; 0.0075 moles) and dichloro DPP(2.7 g; 0.0076 moles).

The resulting pigment showed an X-ray diffraction pattern consisting essentially a mixture of the binary solid compound of example 26 and excess unsubstituted DPP. The rub out evaluation revealed the pigment to be in the same color space as that of a commercial perylene pigment.

EXAMPLE 30

Following the procedure used in example 23, a pigment is prepared using unsubstituted DPP(3.6 g; 0.0125 moles), dibutyl DPP(2.0 g; 0.005 moles) and dichloro DPP(4.4 g; 0.0123 moles).

The resulting pigment was a mixture of pigments. Thus, the binary solid compound of unsubstituted DPP and dichloro DPP did not participate in ternary solid solution formation with dibutyl DPP. Instead the three pigments combined in a totally unpredictable manner to form a mixture of pigments. The rub out evaluation revealed the pigment to be in the same color space as that of a commercial perylene pigment.

EXAMPLE 31

A 500 ml flask equipped with a thermometer, stirrer, and condenser is charged with 15.7 grams of 45% aqueous potassium hydroxide, 13 ml water, and 120 ml DMSO. 12.0 grams of di(4-tert-butylphenyl) DPP and 8.7 grams of unsubstituted DPP are added, stirring at 40–50° C. The mixture is heated to 50–55° C. and stirred at 50–55° C. for five minutes. The resulting solution is drowned into 550 ml water at 20–30° C., causing the pigment to precipitate. The pigment suspension is stirred for 1 hour at 25–30° C. and filtered. The presscake is washed DMSO free with water to a pH 7–8 and dried. The pulverized pigment shows a strong maroon shade by rub out according to ASTM method D-387-60 in a lithographic varnish. The x-ray diffraction pattern is characterized by the following lines:

| Scattering angle (2Θ) | Relative intensity (%) |
|---|---|
| 4.79 | 100 |
| 14.44 | 12 |
| 18.02 | 44 |
| 24.64 | 8 |
| 26.67 | 57 |
| 29.85 | 9 |

EXAMPLE 32

The procedure of Example 31 is repeated using additionally 2.6 grams 2,9-dimethylquinacridone as a third pigment component and 17.7 grams 45% aqueous potassium hydroxide and 16 ml water to yield a ternary pigment solid solution. Relative to the mixed crystal of Example 31 the ternary solid solution is higher in transparency and saturation and darker when applied by rub out according to ASTM method D-387-60 in a lithographic varnish. The ternary solid solution has an x-ray diffraction pattern that is essentially the same as the x-ray diffraction pattern of the mixed crystal of Example 31. The x-ray diffraction pattern is characterized by the following lines:

| Scattering angle (2Θ) | Relative intensity (%) |
|---|---|
| 4.77 | 100 |
| 14.42 | 15 |
| 18.02 | 47 |
| 24.66 | 11 |
| 26.66 | 63 |

EXAMPLE 33

The procedure of Example 31 is repeated using additionally 3.5 grams 2,9-dimethylquinacridone as a third pigment component and 18.5 grams 45% aqueous potassium hydroxide and 16 ml water yielding a ternary pigment solid solution which shows an X-ray diffraction pattern substantially the same as that of the mixed crystal prepared as described in Example 31. Compared with the product of Example 31, the ternary solid solution is higher in transparency and saturation and darker when applied by rub out according to ASTM method D-387-60 in a lithographic varnish. The x-ray diffraction pattern is characterized by the following lines:

| Scattering angle (2Θ) | Relative intensity (%) |
|---|---|
| 4.77 | 100 |
| 14.42 | 16 |
| 18.03 | 40 |
| 24.67 | 12 |
| 26.67 | 59 |

EXAMPLE 34

The procedure of Example 31 is repeated using additionally 4.1 grams 2,9-dichloroquinacridone as a third pigment component, 18.6 grams 45% aqueous potassium hydroxide and 18 ml water and by transferring the pigment solution into 700 ml water instead of 550 ml water. The resulting ternary pigment solid solution shows essentially the same X-ray diffraction pattern as that of the mixed crystal prepared as described in Example 31. Compared with the product of Example 31, the ternary solid solution is higher in transparency and saturation and darker when applied by rub out according to ASTM method D-387-60 in a lithographic varnish. The x-ray diffraction pattern is characterized by the following lines:

| Scattering angle (2Θ) | Relative intensity (%) |
|---|---|
| 4.75 | 100 |
| 14.44 | 15 |
| 18.05 | 41 |
| 26.68 | 60 |

EXAMPLE 35

This example illustrates the incorporation of the highly transparent ternary pigment solid solution obtained according to Example 32 mixed with a pearlescent mica pigment in an automotive coating finish.

Pigment Dispersion 80.0 grams Non-Aqueous Dispersion resin (NAD-resin), 17.6 grams dispersant resin, 70.4 grams aromatic solvent (SOLVESSO 100 from ESSO) and 32.0 grams DPP pigment obtained according to Example 32 are ball milled for 64 hours. The dispersion contains 16.0% pigment and 48.0% solids at a pigment to binder ratio of 0.5.

Stabilized Resin Solution 144.6 grams of xylene, 90.0 grams methanol, 1353.0 grams NAD-resin, 786.2 grams melamine resin, 65.6 grams UV-screener solution, 471.6 grams acrylourethane resin, and 89.0 grams catalyst solution are mixed with an impeller stirrer in an one gallon jar.

Mica Formulation 251.1 grams pearlescent, titanium dioxide coated mica pigment, 315.0 grams NAD-resin, and 180.0 grams acrylourethane resin are mixed in a glass container. The mica formulation contains 27.9% mica pigment and 57.3% solids at a pigment to binder ratio of 0.5.

Paint Formulation (50 Parts Pigment/50 Parts Mica) 28.7 grams of the above described pigment dispersion, 16.5 grams of the above described mica formulation, 61.0 grams acrylourethane resin, 3.5 grams NAD resin, and 70.2 grams of the above described stabilized resin solution are mixed and sprayed onto a primed aluminum panel, followed by spraying a clearcoat resin onto the colored basecoat. The panel is exposed to ambient air for 10 minutes and stoved for 30 minutes at 130° C. A unique maroon shade colored coating is obtained displaying an appearance of color depth and high flop with excellent weatherability. Similar colored panels are obtained using the pigments prepared according to Examples 33 to 34.

What is claimed is:

1. A single-phase ternary solid solution consisting of two different compounds of formulae

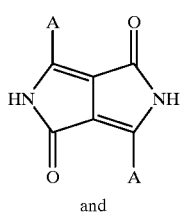

(I)

and

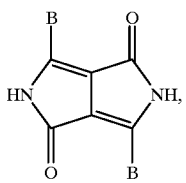

(II)

wherein A and B, which must be different, are each a group of formula

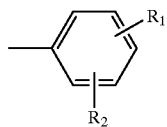

wherein $R_1$ and $R_2$ are each independently of the other hydrogen, methyl, tert-butyl, chloro, bromo or CN wherein the 1,4-diketopyrrolo[3,4-c]pyrrole having the smaller geometric constitution comprises 50 to 70 mole % of the mixture of the compounds of formulae (I) and (II);

and 4 to 28 mole-percent relative to the sum of (I) plus (II), of a third component, which third component is a quinacridone of formula

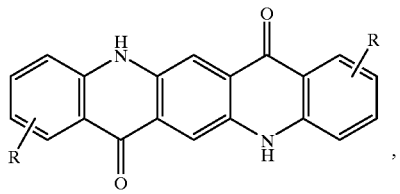

(XII)

wherein R is hydrogen, halogen, $C_1$–$C_6$alkyl or $C_1$–$C_6$alkoxy, or which third component is a 1,4-diketopyrrolo[3,4-c] pyrrole different from I and II of the formula

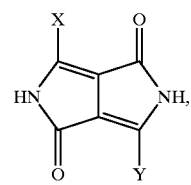

(XIII)

wherein X and Y are each independently a group of formula

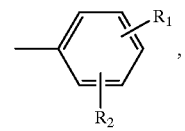

with $R_1$ and $R_2$ having the same meaning given above; wherein the ternary solid solution has an x-ray diffraction pattern that is essentially the same as the x-ray diffraction pattern exhibited by a mixed crystal composed of an equimolar amount of (I) and (II); with the proviso that the third component is not a disubstituted quinacridone when components (I) and (II) are 1,4-diketo-3,6-diphenylpyrrolo [3,4-c]pyrrole and 1,4-diketo-3,6-di(4-chlorophenyl)pyrrolo [3,4-c]pyrrole.

2. A ternary solid solution according to claim 1, wherein at least one of $R_1$ and $R_2$ is hydrogen.

3. A ternary solid solution according to claim 1, wherein the third component is a quinacridone of formula XII, wherein R is hydrogen, chloro, $C_1$–$C_3$alkyl, methoxy or ethoxy.

4. A ternary solid solution according to claim 3, wherein R is hydrogen, chloro or methyl.

5. A ternary solid solution according to claim 1 wherein the third component is a 1,4-diketopyrrolo[3,4-c]pyrrole of formula XIII, wherein $R_1$ and $R_2$ are each independently of the other hydrogen, chloro, bromo, $C_1$–$C_4$alkyl, $C_1$–$C_6$alkoxy, $C_1$–$C_6$alkylamino or CN.

6. A ternary solid solution according to claim 5, wherein in formula XIII, X and Y are identical groups and $R_1$ and $R_2$ are each independently of the other hydrogen, methyl, tert-butyl, chloro, bromo or CN.

7. A ternary solid solution according to claim 6, wherein at least one of $R_1$ and $R_2$ is hydrogen in each of (I) and (II).

8. A ternary solid solution according to claim 1 wherein (I) and (II) are selected from the group consisting of 1,4-diketo-3,6-diphenylpyrrolo[3,4-c]pyrrole, 1,4-diketo-3,6-di (4-chlorophenyl)pyrrolo[3,4-c]pyrrole and 1,4-diketo-3,6-di (4-tert-butylphenyl)pyrrolo[3,4-c]pyrrole.

9. A ternary solid solution according to claim 8 wherein (I) is 1,4-diketo-3,6-diphenylpyrrolo[3,4-c]pyrrole and (II) is 1,4-diketo-3,6-di(4-chlorophenyl)pyrrolo[3,4-c]pyrrole.

10. A ternary solid solution according to claim 8 wherein (I) is 1,4-diketo-3,6-diphenylpyrrolo[3,4-c]pyrrole and (II) is 1,4-diketo-3,6-di(4-tert-butylphenyl)pyrrole[3,4-c] pyrrole.

11. A ternary solid solution according to claim 8 wherein (I) is 1,4-diketo-3,6-di(4-chlorophenyl)pyrrolo[3,4-c] pyrrole and (II) is 1,4-diketo-3,6-di(4-tert-butylphenyl) pyrrole[3,4-c]pyrrole.

12. A ternary solid solution according to claim 8 wherein the third component is 2,9-dichloroquinacridone or 2,9-dimethylquinacridone.

13. A ternary solid solution according to claim 11 wherein the third component is 1,4-diketo-3,6-diphenylpyrrolo[3,4-c]pyrrole or 2,9-dichloroquinacridone.

14. A ternary solid solution of claim 13 wherein the third component is 1,4-diketo-3,6-diphenylpyrrolo[3,4-c]pyrrole which ternary solid solution is characterized by an x-ray diffraction pattern which exhibits peaks at 4.6±0.2° 2θ, 18.0±0.2° 2θ, and 26.7±0.2° 2θ.

15. A ternary solid solution of claim 14 which consists of about 20 parts by weight of the 1,4-diketo-3,6-diphenylpyrrolo[3,4-c]pyrrole, about 38 parts by weight of 1,4-diketo-3,6-di(4-chlorophenyl)pyrrolo[3,4-c]pyrrole about 42 parts by weight of 1,4-diketo-3,6-di(4-tert-butylphenyl)pyrrolo[3,4-c]pyrrole.

16. A ternary solid solution of claim 13 wherein the third component is 2,9-dichloroquinacridone which ternary solid solution is characterized by an x-ray diffraction pattern which exhibits peaks at 4.6±0.2° 2θ, 17.9±0.2° 2θ, and 26.5±0.2° 2θ.

17. A ternary solid solution of claim 10 wherein the third component is 2,9-dichloroquinacridone or 2,9-dimethylquinacridone and which is characterized by an x-ray diffraction pattern which exhibits peaks at 4.7±0.2° 2θ, 18.0±0.2° 2θ, and 26.7±0.2° 2θ.

18. A ternary solid solution of claim 10 wherein the third component is 1,4-diketo-3,6-di(4-chlorophenyl)pyrrole[3,4-c] and which ternary solid solution is characterized by an x-ray diffraction pattern which exhibits peaks at 4.7±0.2° 2θ, 18.0±0.2° 2θ, and 26.6±0.2° 2θ.

19. A ternary solid solution of claim 1 which comprises from 15 to 25 mole-percent of the third component.

20. A ternary solid solution of claim 1 which comprises an equimolar ratio of (I) and (II).

21. A pigment composition which comprises a ternary solid solution of claim 1 together with an excess of the third component.

* * * * *